United States Patent
Kotchick et al.

(10) Patent No.: US 6,975,455 B1
(45) Date of Patent: Dec. 13, 2005

(54) TRANSFLECTIVE LAYER FOR DISPLAYS

(75) Inventors: Keith M. Kotchick, St. Paul, MN (US); Philip E. Watson, Maplewood, MN (US); Robert Bennet, Berkshire (GB)

(73) Assignee: 3M Innovative Properties Company, St. Paul, MN (US)

( * ) Notice: Subject to any disclaimer, the term of this patent is extended or adjusted under 35 U.S.C. 154(b) by 770 days.

(21) Appl. No.: 09/551,111

(22) Filed: Apr. 18, 2000

(51) Int. Cl.⁷ ............................ G02B 5/30; G02B 27/28
(52) U.S. Cl. ...................... 359/487; 359/490; 359/494; 359/497; 359/502; 359/599
(58) Field of Search ............................... 359/487, 488, 359/495, 497, 500, 494, 502, 599; 349/96, 349/97, 98

(56) References Cited

U.S. PATENT DOCUMENTS

| | | | |
|---|---|---|---|
| 5,686,979 A | | 11/1997 | Aastuen et al. |
| 5,828,488 A | * | 10/1998 | Ouderkirk et al. .......... 359/495 |
| 6,025,897 A | * | 2/2000 | Weber et al. |
| 6,124,905 A | | 9/2000 | Iijima |
| 6,124,971 A | * | 9/2000 | Ouderkirk et al. .......... 359/497 |
| 6,141,068 A | * | 10/2000 | Iijima |
| 6,317,180 B1 | * | 11/2001 | Kuroiwa et al. |

FOREIGN PATENT DOCUMENTS

| | | |
|---|---|---|
| EP | 890 866 | 1/1999 |
| EP | 0 913 721 | 6/1999 |
| EP | 953 864 | 11/1999 |
| JP | 11281974 | 10/1999 |
| WO | 95/17691 | 6/1995 |
| WO | 97/01788 | 1/1997 |
| WO | WO 98/54616 | 12/1998 |

* cited by examiner

Primary Examiner—Ricky D. Shafer
(74) Attorney, Agent, or Firm—Anna A. Kobilansky

(57) ABSTRACT

A transflective assembly includes an absorbing polarizer and a first reflective polarizer disposed to reflect at least a portion of light transmitted through the absorbing polarizer. A second reflective polarizer is disposed between the absorbing polarizer and the first reflective polarizer. The second reflective polarizer reflects light transmitted through the first reflective polarizer having a polarization absorbable in the absorbing polarizer, and transmits light transmitted through the absorbing polarizer towards the first reflective polarizer.

35 Claims, 13 Drawing Sheets

TRANSFLECTIVE LAYER FOR DISPLAYS

FIELD OF THE INVENTION

This invention relates generally to displays, and particularly to transflective displays that operate under ambient lighting and also with backlighting.

BACKGROUND

The physical downsizing of microprocessor-based technologies has led to the development of portable personal computers, pocket secretaries, wireless phones, and pagers. All of these devices, and other devices such as clocks, watches, calculators, etc., have the common need for a data display screen having low power consumption in order to extend the useful working period between battery replacements or battery charging.

The most common type of display in such devices is the liquid crystal display (LCD). LCDs may be classified based upon the source of illumination. Reflective displays are illuminated by ambient light entering the display from the front. A reflective surface, such as a brushed metal reflector placed behind the LCD returns light that has been transmitted through the LCD while preserving the polarization orientation of the light incident on the reflective surface. Although reflective displays meet the need for low power consumption, the displays are only useful under good ambient lighting conditions. Under low levels of ambient light, the display often appears dark and is difficult to read. Therefore, the purely reflective display has limited utility.

Another type of LCD display is a backlit display, in which backlight is used to illuminate the display. The viewer views light that has been transmitted through the LCD display from the backlight. Typically, the backlight assembly includes a lamp, light-emitting diode (LED) or other device that emits light, and some optical elements to direct the light from the light emitter to the LCD. Backlighting may also be used to supplement a reflective display so that it can be used over a wide range of ambient light conditions. However, the introduction of a backlit assembly increases the power drain on the battery, significantly reducing the useful length of a battery, or the time between battery chargings.

The combination of backlighting with an ambient reflective display introduces the need for a "transflective" film. The transflective film is placed between the LCD and the light source, and is used for reflecting ambient light that has been transmitted through the LCD and transmitting light from the light source to illuminate the LCD. However, under ambient lighting conditions, the characters displayed on the screen may be dark while the background is light, while under backlighting conditions the characters appear to be light on a dark background. In other words, the backlit image is inverted relative to the ambient reflective image. This problem may be overcome electronically, by inverting the parity of the LCD display when the backlight is illuminated. The user may experience some annoyance or discomfort when the parity of the display flips from one state to another. Another problem with this type of display is washout, which occurs when the ambient light and the backlight have approximately the same intensity, thus making it difficult to see the information presented on the display.

Furthermore, there are certain applications, such as cell phones and pagers, where it may be desirable for the backlight to be illuminated whenever the user is using the device, in order to ensure a certain minimum viewability, irrespective of the ambient lighting conditions. In such a case, it is not possible to switch the parity of the LCD, since the display has, at all times, to be able to operate in a reflective mode. Therefore, the transflective film has to permit the backlit image to be non-inverted relative to the ambient reflective image. The currently available non-inverting transflective films operate with high losses, reducing their suitability for reflecting ambient light, and increasing the amount of optical power that needs to be generated in order for the viewer to correctly view the backlit image.

Accordingly, there is a need for an improved non-inverting transflective film that will reduce the power requirements for the backlight illuminator, while maintaining high viewability of the displayed image.

SUMMARY

Generally, the present invention relates to a transflective display having a non-inverting image with increased brightness.

In one particular embodiment, the invention includes a transflective assembly, having an absorbing polarizer with a transmission polarization axis. A first reflective polarizer is disposed to receive light transmitted through the absorbing polarizer, the first reflective polarizer having a transmission polarization axis substantially parallel with the transmission polarization axis of the absorbing polarizer. A second reflective polarizer layer is disposed to receive light transmitted through the first reflective polarizing layer from the absorbing polarizer, and has a transmission polarization axis non-parallel with the transmission polarization axis of the absorbing polarizer.

In another particular embodiment, the invention includes a polarizer assembly having absorbing polarizer means for absorbing light of a first polarization state and transmitting light in a second polarization state orthogonal to the first polarization state, and first polarizing reflecting means for reflecting light in a third polarization state non-parallel with the first and the second polarization states and for transmitting light in a fourth polarization state orthogonal to the third polarization state. Second polarizing reflecting means is disposed between the absorbing polarizer means and the first polarizing reflecting means for reflecting light in the first polarization state and transmitting light in the second polarization state.

In another particular embodiment of the invention, an optical system has a transflector assembly that includes a first absorbing polarizer, having a transmission polarization axis, and a first reflective polarizer disposed to receive light transmitted through the absorbing polarizer, the first reflective polarizer having a transmission polarization axis substantially parallel with the transmission polarization axis of the first absorbing polarizer. A second reflective polarizer layer is disposed in the assembly to receive light transmitted through the first reflective polarizing layer from the first absorbing polarizer, the second reflective polarizer having a transmission polarization axis non-parallel with the transmission polarization axis of the first absorbing polarizer. the system further includes a light source disposed to transmit light towards the second reflective polarizer layer of the transflector assembly.

Another embodiment of the invention is a transflective assembly that includes an absorbing polarizer, and a first reflective polarizer disposed to reflect at least a portion of light transmitted through the absorbing polarizer. A second reflective polarizer is disposed between the absorbing polarizer and the first reflective polarizer. The second reflective polarizer reflects light transmitted through the first reflective polarizer having a polarization absorbable in the absorbing polarizer, and also transmits light transmitted through the absorbing polarizer towards the first reflective polarizer.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
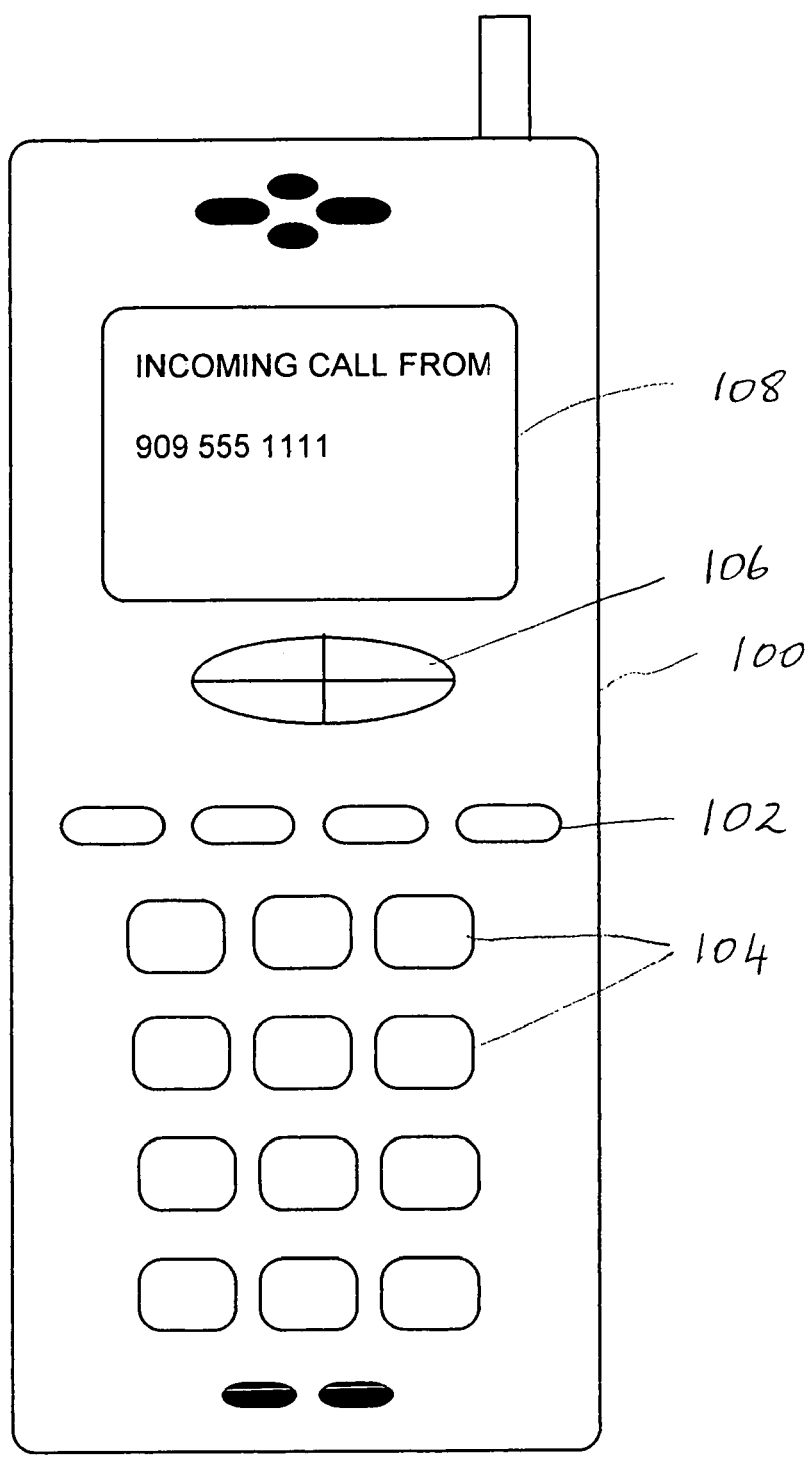
FIG. 1 illustrates a cell phone using a transflective display.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally applicable to transflective displays, and is believed to be particularly useful in enhancing the brightness of transflective displays, and in reducing the power consumption of such displays.

Transflective type displays are useful for displaying information in many types of device, including computers, portable organizers, cell phones, pagers, and internet appliances. FIG. 1 illustrates a transflective display in a cell phone 100. The cell phone 100 may include control buttons 102, dialing buttons 104, and some cursor control buttons 106 to control a cursor in a transflective display 108. The transflective display 108 displays several types of information, for example dialing information, call receiving information, information received by the cell phone 100, and menus for selecting particular functions and settings on the cell phone 100 itself.

Figure 2:
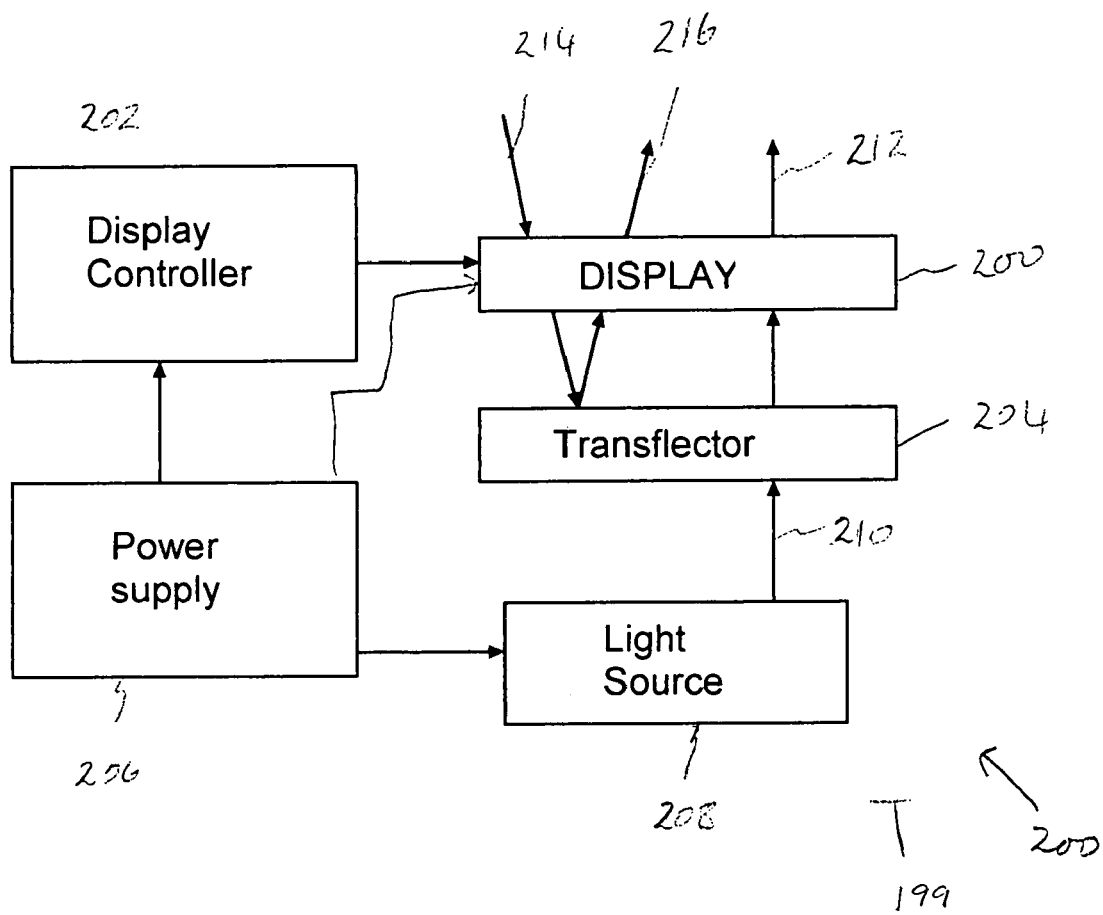
FIG. 2 schematically illustrates power, control signal and light flow in a transflective display.

A schematic representation of a transflective display unit 199 is illustrated in FIG. 2. A display 200, typically a liquid crystal display (LCD) or the like, is connected to a controller 202 which controls the information displayed on the display 200. A transflector film 204 is positioned below the display 200. A power supply 206 supplies power to the display controller 202, to the display 200, and also to a light source 208. The power supply 206 may be a battery, a rechargeable battery, or other source of electrical power. Where the power supply 206 is a battery, it is advantageous to reduce the amount of power required by the light source 208 and the display controller 202, in order to extend battery life.

The light source 208 is used to generate light 210 which passes through the transflector 204 and the display 200, and out to the user as light 212. In the ambient display mode, ambient light 214 is incident on the display 200. Light that is transmitted by the display 200 and reflected by the transflector 204 passes out towards the viewer as light 216, continuing the image to be displayed to the viewer.

Figure 3:
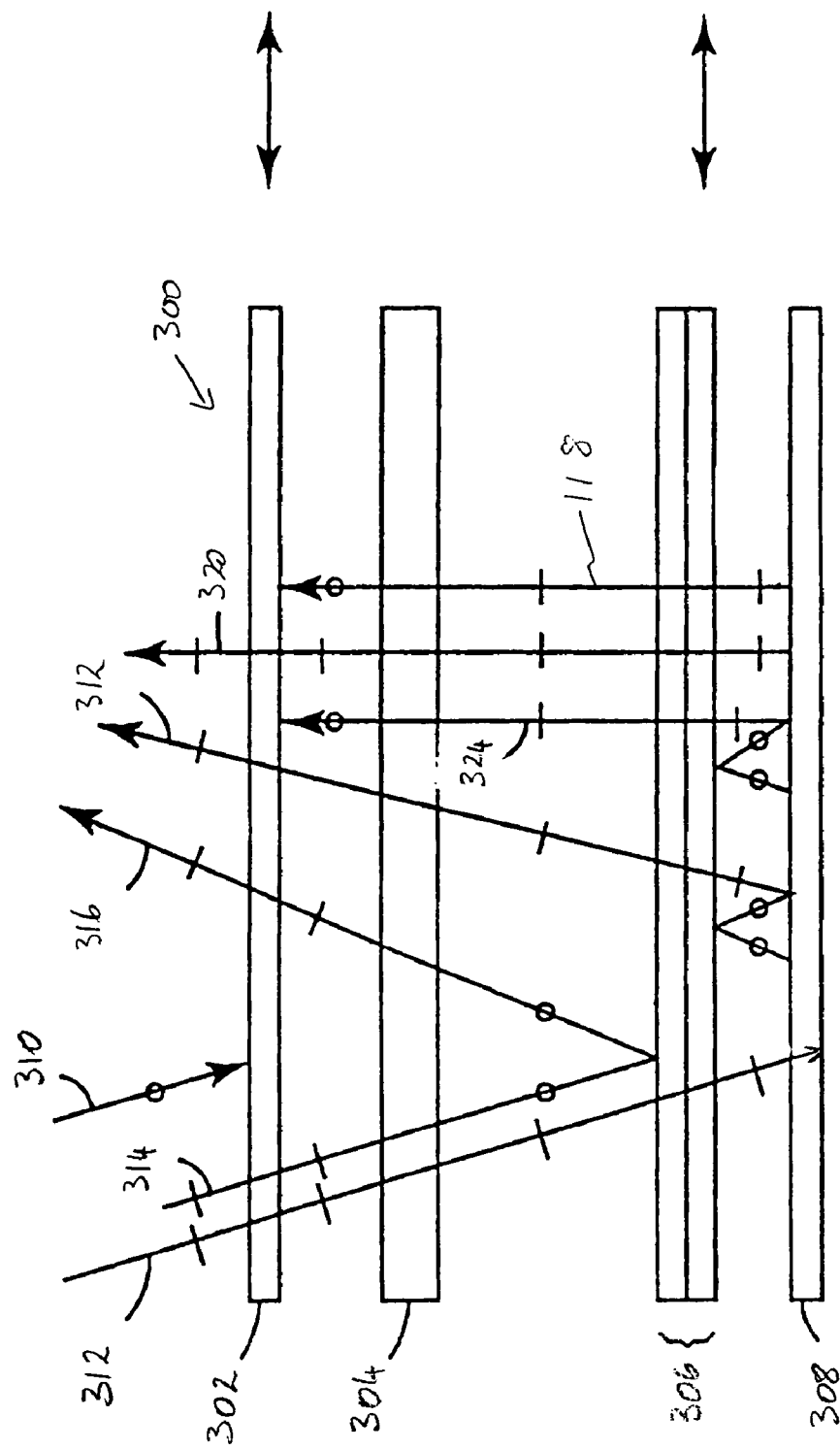
FIG. 3 schematically illustrates a transflective display with an inverting image.

An embodiment of a conventional transflective display 300 is illustrated in FIG. 3. The display 300 has an absorbing polarizer film 302, an LCD 304, and a transflective layer 306. The transflective layer may be, for example, a reflecting polarizer that has high reflectivity for light in one polarization state and high transmission for light in the orthogonal polarization state. A backlight source 308 is positioned below the transflective film 306.

First we consider ambient light incident on the polarizer film 302. Light ray 310 having a polarization orthogonal to the pass polarization state of the absorbing polarizer 302 is absorbed in the polarizer film 302. Light 312 having a polarization that is transmitted by the absorbing polarizer 302 is transmitted through the LCD 304 without having its polarization rotated. The ray 312 is transmitted through the transflective film 306. Another ray 314 is transmitted through the absorbing polarizer 302 and the LCD 304. The polarization of ray 314 is rotated by the LCD 304, and therefore is strongly reflected by the transflective film 306, as ray 316, which the users views as image light.

When operating under backlit conditions, the display 300 reverses the image as compared to when operating under ambient light. When backlit, ray 318 is transmitted through the transflective film 306, and its polarization is rotated by the LCD 304, before it is absorbed in the absorbing polarizer 302. Ray 320 is transmitted through the transflective layer 306, through the LCD without polarization rotation, and is transmitted through the absorbing polarizer 302. Backlit ray 322 is originally reflected by the transflector layer 306, but may be passed through the transflector after having its polarization randomized through recycling between the transflector layer 306 and the backlight source 308. The polarization of ray 322 is not rotated on transmission through the LCD 304, and is therefore transmitted through the absorbing polarizer 302. Ray 324 is originally reflected by the transflector layer 306, but is recycled until its polarization allows transmission. The polarization of ray 324 is rotated by the LCD 304, and so is absorbed in the absorbing polarizer 302.

Accordingly, under ambient lighting conditions, those rays whose polarization is rotated upon transmission through the LCD form the image. In contrast, under backlighting, those rays whose polarization is not rotated by the LCD form the image viewed by the user. Therefore, under ambient lighting conditions the characters displayed on the screen may be dark while the background is light, but under backlighting conditions the characters appear to be light on a dark background. In other words, the backlit image is inverted relative to the ambient reflective image. This problem may be overcome electronically, by inverting the parity of the LCD display when the backlight is illuminated. The user may experience some annoyance or discomfort when the parity of the display flips from one state to another. It will be appreciated that the display may be monochromatic, or may be a color display, with different pixels producing different colors.

Furthermore, there are certain applications, such as cell phones and pagers, where it may be desirable for the backlight to be illuminated whenever the user is using the device, in order to ensure a certain minimum viewability, irrespective of the ambient lighting conditions. In such a case, it is not possible to switch the parity of the LCD, since the display has, at all times, to be able to operate in a reflective mode. Therefore, the transflective film has to permit the backlit image to be non-inverted relative to the ambient reflective image. The currently available non-inverting transflective films operate with high losses, reducing their suitability for reflecting ambient light, and increasing the amount of optical power that needs to be generated in order for the viewer to correctly view the backlit image.

Figure 4:
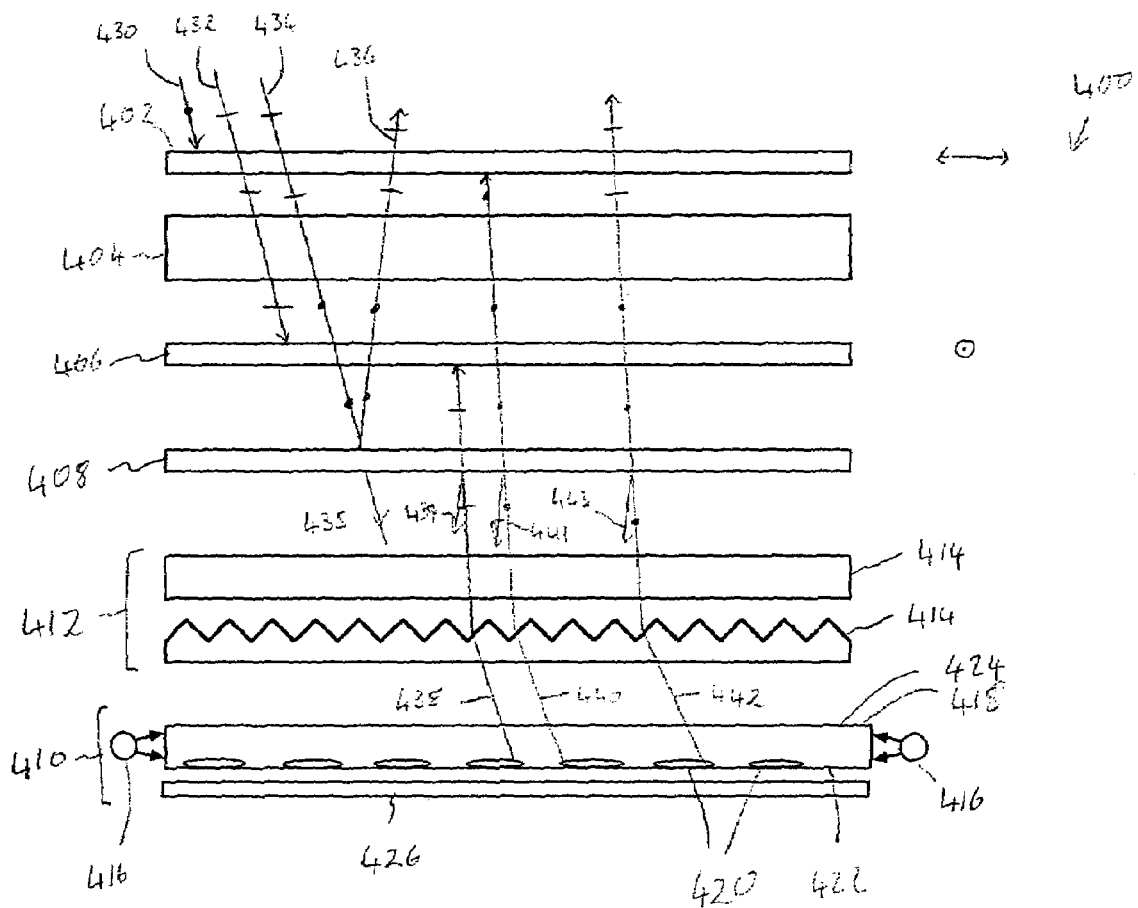
FIG. 4 schematically illustrates an embodiment of a transflective display that produces a non-inverting image.

One embodiment of a non-inverting transflective display is illustrated in FIG. 4. The display 400 includes an absorbing polarizer film 402, an LCD 404 and a lower absorbing polarizer film 406. A transflective film 408 is positioned below the lower absorbing polarizer 406. A light source 410 is disposed in the display 400 to generate light to pass through the LCD 404. A light control layer 412 may be disposed between the transflector film 408 and the light source 410 in order to enhance the illumination characteristics of the light transmitted from the light source 410.

In this particular embodiment, the transflective film 408 is a semi-reflecting film, for example a film having a partial reflector formed by dielectric layers, or a polymer film that includes a suspension of metallic flakes. In the latter case, some light is reflected by the flakes, while other light is transmitted between the flakes. The semi-reflecting film may also be a film having a textured surface with a deposited metallic layer or a film having a metallic layer that is brushed after deposition to create texture.

The light control layer 412 may include one or more films 414 having microstructured prismatic surfaces thereon, for redirecting light from the light source 410 towards the axis of the display 400. For example, the prismatic layer 414 may be a BEF film produced by 3M Company, St. Paul, Minn. The light control layer 412 may include two prismatic films 414, one crossed relative to the other, so that the divergence of the light is controlled in two dimensions, for example in the plane of the figure and out of the plane of the figure.

The light source 410 advantageously illuminates the LCD uniformly so that the viewer sees substantially constant light intensity across the display 400. In this particular embodiment, the light source 410 includes one or more light emitters 416 which emit light into a light guide 418. The light emitters 416 may be, for example, light emitting diodes (LEDs), fluorescent lights, or any other suitable light emitting device. The LEDs may be monochromatic, or may include a number of emitters operating at different wavelengths in order to produce a white light output.

The light guide 418 guides the light from the light emitters 416, and directs the light towards the LCD 404. In this particular embodiment, the light guide 418 includes light diffusing spots 420 on its lower surface 422. Light propagating along the light guide 418 that is incident on the light diffusing spots 420 is diffusely reflected from the spots 420 and passes up through the upper surface 424 of the light guide towards the LCD 404. Reflective film 426 may be positioned below the light guide 418 in order to reflect any light that passes down through the light guide 418 from the light control layer 412. For example, the reflecting layer 426 may be an EDR film produced by 3M Company, St. Paul, Minn.

We now consider the passage of light through the display 400. The pass polarization states, also referred to as the transmission polarization state, of the upper and lower absorbing polarizers 402 and 406 are crossed in this particular embodiment. Ray 430, incident on the absorbing polarizer 402 having a polarization orthogonal to the pass polarization state of the upper absorbing polarizer 402 is absorbed by the upper polarizing absorber 402. Ray 432 is transmitted through the polarizing absorber 402 and passes through the LCD 404 without having the polarization rotated. Ray 432 is absorbed in the lower polarizing absorber 406.

Ray 434 is transmitted through the upper polarizing absorber 402, and has its polarization rotated upon passage through the LCD 404. Ray 434 passes through the lower absorbing polarizer 406, and a significant fraction is reflected off the transflector film 408, to be transmitted back out of the display 400 as image ray 436. A portion of ray 434 is transmitted through the transflector film 408 as ray 435, where it passes towards the light source. This light may eventually leak out of the display 400 as background light.

We now consider light passing through the display 400 from the backlight 410. Ray 438 is deflected upwards by a diffusing spot 420, and is redirected towards the axis of the display 400 by the control layer 412. The ray 438 passes through the transflector film 408, losing a fraction 439 by reflection at the transflector film 408. The polarization of ray 438 is orthogonal to the pass polarization state of the lower absorbing polarizer 406 and is, therefore, absorbed by the lower absorbing polarizer 406.

Ray 440 passes through the light control layer 412, and loses a fraction 441 by reflection at the transflector layer 408. The polarization of ray 440 is parallel to the pass polarization state of the lower absorbing polarizer 406 and is, therefore, transmitted through the lower absorbing polarizer 406 and the LCD 404. The polarization of ray 440 is not rotated by the LCD 404, and therefore ray 440 is absorbed in the upper absorbing polarizer 402. Ray 442 is redirected by the light control layer 412, and loses a fraction 443 by reflection off the transflector layer 408. The polarization of ray 442 is parallel to the pass polarization of the lower absorbing polarizer 406, and therefore passes up towards the LCD 404, where its polarization is rotated. Therefore, ray 442 passes out of the upper absorbing polarizer 402 to be viewed by the user as image light.

It will be appreciated that, in this type of display, the polarizations of both the ambient light and the backlight that are viewed by the user have been rotated by the LCD 404. Accordingly, this may be referred to as a non-inverting image display. This contrasts with the inverting display 100 illustrated in FIG. 1, where the ambient light viewed by the user has it polarization rotated in the LCD, while the backlight viewed by the user does not have its polarization rotated in the LCD, or vice versa.

The reflective transflector layer 408, however, transmits a significant portion of the ambient light, and reflects a significant portion of the backlight. Therefore, this type of display is relatively inefficient, resulting in high power consumption.

It will also be appreciated that the pass polarization states of the upper and lower absorbing polarizers 402 and 406 need not be crossed at 900 relative to each other, but may be at some other angle, depending on how much the LCD 404 rotates the light passing therethrough.

Figure 5:
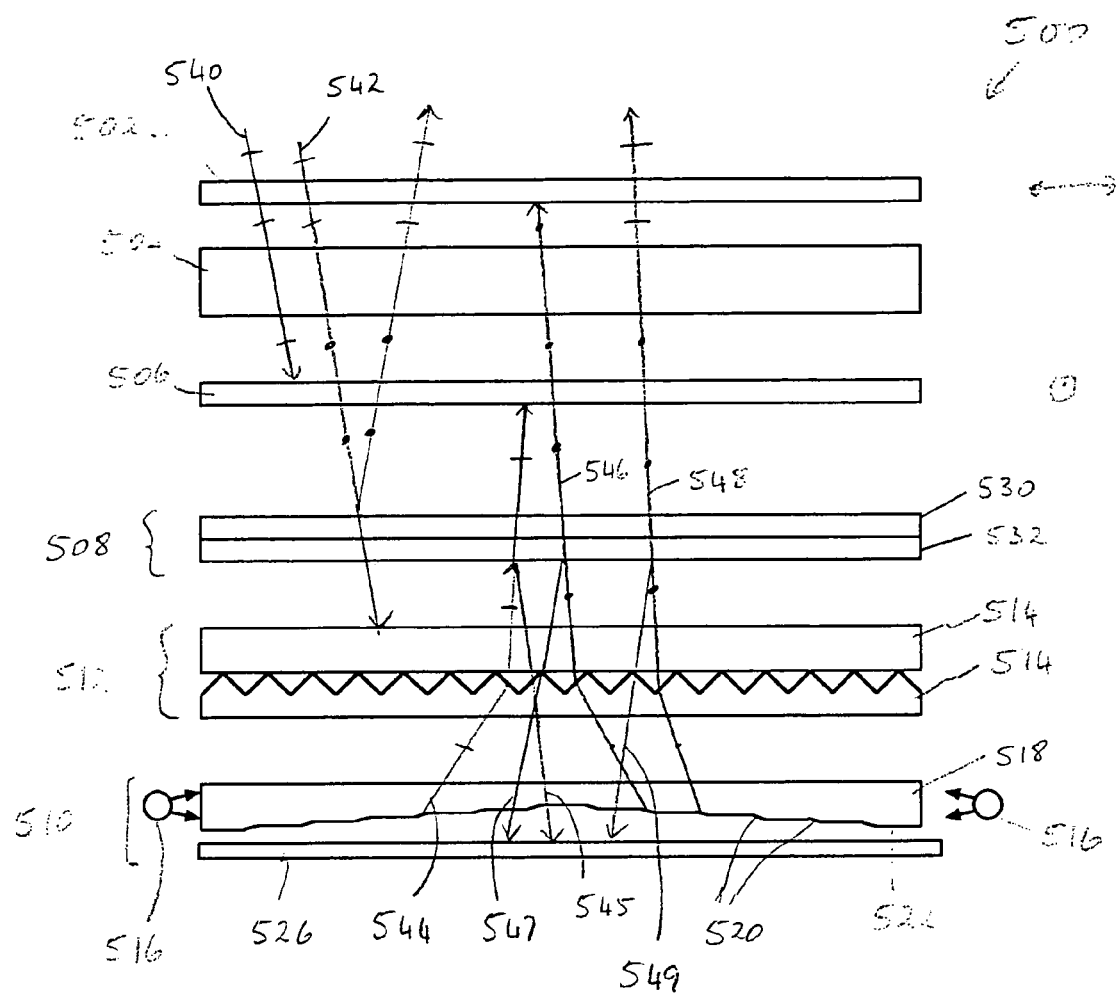
FIG. 5 schematically illustrates another embodiment of a transflective display that produces a non-inverting image.

A different embodiment of transflective display 500, disclosed in WO 97/01788, incorporated herein by reference, is illustrated in FIG. 5. The display 500 includes crossed upper and lower absorbing polarizers 502 and 506, with an LCD 504 therebetween. A transflector layer 508 is positioned below the lower absorbing layer 506. A light control layer 512 is positioned below the transflective layer 508. A backlight source 510 is positioned below the light control layer 512 for directing light up through the display 500 for backlight operation.

In this embodiment, the transflective layer 508 is formed from two layers. The upper layer 530 is a lightly diffusive layer, while the lower layer 532 is a reflective polarizer. The diffuser layer 530 may be, for example, an adhesive layer used to adhere the transflector layer 508 to the lower absorbing polarizer 506. The diffusing layer 530 may be used to homogenize the uniformity of the image seen by the viewer. Advantageously, the diffusing layer 530 is a polarization preserving layer.

In this embodiment of display 500, the light source 510 uses a light guide 518 provided with facets 520 on its lower surface 522. Light from the light emitters 516 is extracted from the light guide 518 by reflecting off the facets 520 in an upwards direction. The size and positioning of the facets 520 may be selected in order to provide uniform extraction of light along the length of the light guide 518. A diffusely reflective layer 526 is positioned below the light guide 518 to reflect any light being recycled, either from the light control layer 512 or the reflective polarizer 532.

The display 500 operates in the following manner. First, consider ambient light incident on the upper absorbing polarizer 502. Ray 540 is polarized parallel to the pass polarization state of the upper absorbing polarizer 502, and is transmitted through the LCD 504. The polarization of ray 540 is not rotated by the LCD 504, and is therefore absorbed in the lower absorbing polarizer 506. Ray 542 has a polarization that is transmitted by the upper absorbing polarizer 502. The polarization of ray 542 is rotated by the LCD 504, and therefore ray 542 is transmitted through the lower absorbing polarizer 506. Ray 542 is reflected by the transflective layer, back up through the lower absorbing polarizer and the LCD 504, where its polarization is rotated once more, and is transmitted through the upper absorbing polarizer 502 to be seen by the viewer as image light.

Ray 544 is directed upwards from the light guide 518 and the light control layer 512. The orientation of the reflective polarizer 532 is selected so that a significant fraction of the light incident from the backlight, having the polarization transmitted by the lower absorbing polarizer 506, is reflected. Therefore, a significant fraction of ray 544, which is polarized orthogonal to the pass polarization state of the power absorbing polarizer 506, is transmitted through the transflector layer 508 to be absorbed by the lower absorbing polarizer 506. However, a portion of ray 544 is reflected by the reflecting polarizer 532 as ray 545 towards the diffuse reflector 526. Therefore, light in ray 545 may be recycled by reflection off the diffuse reflector 526.

Ray 546 is directed upwards by the light guide 518 and the light control layer 512. A fraction of ray 546 is reflected by the reflecting polarizer 532 as ray 547, to be recycled. That fraction of ray 546 transmitted through the transflector layer 508 passes through the lower absorbing polarizer 506, and through the LCD 504. The LCD 504 does not rotate the polarization of ray 546, and therefore ray 546 is absorbed in the upper absorbing polarizer 502. Ray 548 is directed upwards by the light guide 518 and the light control layer 512. A fraction of ray 548 is reflected by the reflecting polarizer 532 towards the light diffuser 526, where it may be recycled. That fraction of ray 548 that passes through the transflector layer 508 is transmitted through the lower absorbing polarizer 506. The polarization of ray 548 is rotated by the LCD 504, and so ray 548 passes through the upper absorbing polarizer 502 to be viewed by the user as image light.

An advantage provided by this embodiment of transflective display 500 is that the amount of ambient light reflected by the transflector 508 can be increased relative to the embodiment illustrated in FIG. 4. This may be achieved by selecting the orientation of the transmission axis of the reflecting polarizer 532 relative to the transmission axis of the lower absorbing polarizer 506. However, increasing the reflectivity of the transflector layer 508 for light transmitted through the lower absorbing polarizer 506, also results in increasing the reflection of the backlight that has a polarization transmitted through the lower absorbing polarizer 506. Furthermore, the transmission of light through the transflector layer 508 that is absorbed in the lower absorbing polarizer 506 is increased.

According to WO 97/01788, the performance of the transflective display 500 under ambient lighting conditions may be traded off against its performance under backlight conditions by selecting a particular angle between the transmission axis of the reflecting polarizer 532 and the transmission axis of the lower absorbing polarizer 506. An angle of approximately 72° is typically selected as a compromise for operation under both ambient and backlight conditions.

The transmission axis, or transmission polarization axis, is defined as a polarization axis of a polarizer. For a linear polarizer, the polarization component of incident light that is parallel to the transmission axis is transmitted by the polarizer. The transmission polarization state of a polarizer is that polarization state that is maximally transmitted by a polarizer. For a linear polarizer, the transmission polarization state is a linear polarization state having a polarization direction parallel to the transmission polarization axis. For a circular polarizer, the transmission polarization state is a circular polarization state having the handedness of polarization passed by the circular polarizer.

Figure 6:
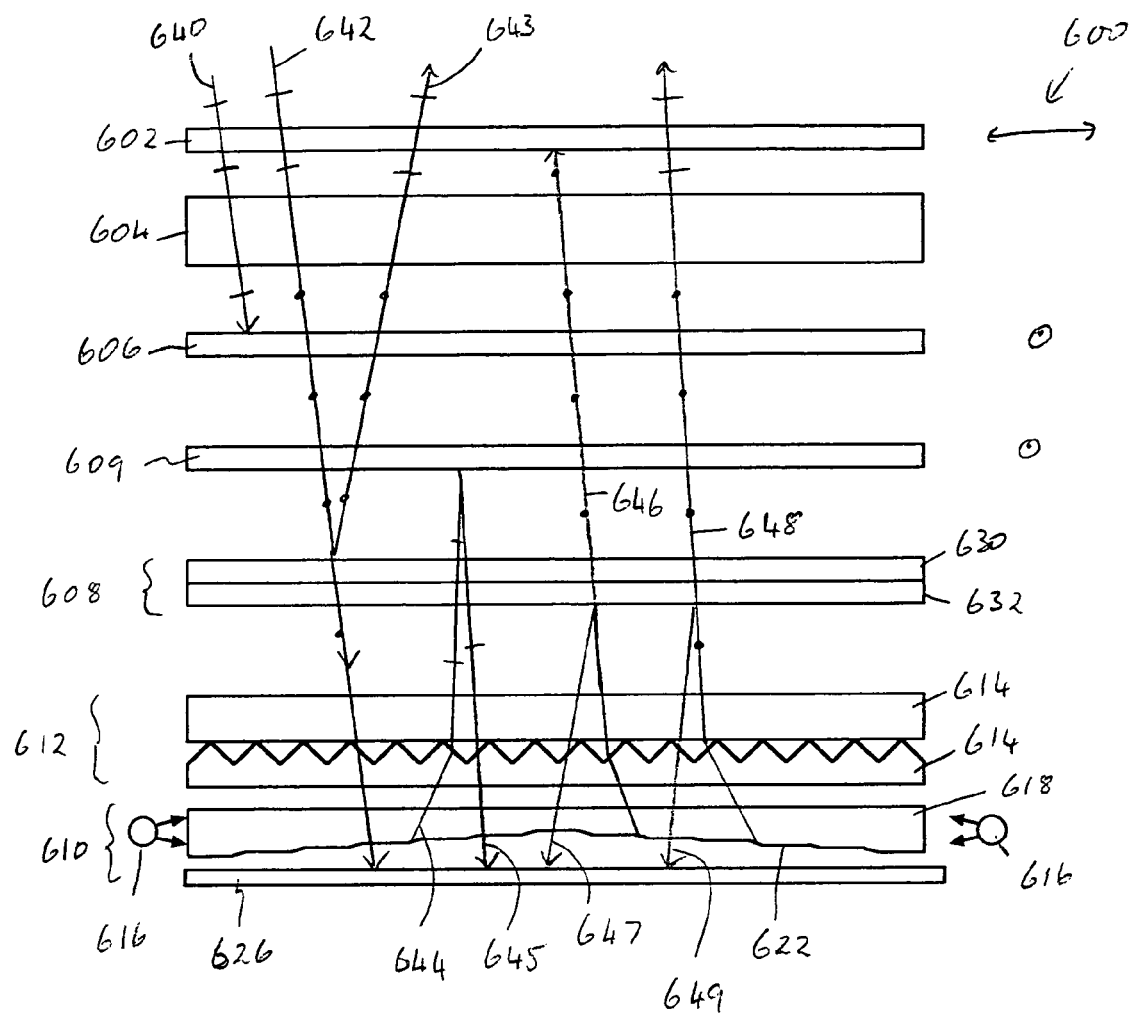
FIG. 6 schematically illustrates an embodiment of a modified transflective display according to the present invention that produces a non-inverting image.

One particular embodiment of a transflective display according to the present invention is illustrated in FIG. 6. The display 600 includes two absorbing polarizers 602 and 606, with an LCD 604 therebetween. Below the lower absorbing polarizer 606 is a transflector layer 608 formed from a lightly diffusing layer 630 and a reflective polarizer 632. The transmission axis of the reflecting polarizer 632 is set at an angle relative to the transmission axis of the lower absorbing polarizer 606. A light control layer 612 is disposed below the transflector layer 608 to control the direction of light passing through display 600 from the light source 610. In this embodiment, the light source includes a light guide 618 having a faceted rear surface 622 for extracting light from the light guide 618. A diffusive, highly reflective layer 626 may be disposed below the light guide 618 for reflecting and recycling light.

A reflecting polarizer 609, having its axis of transmission oriented substantially parallel to the transmission axis of the lower absorbing polarizer 606, is positioned between the lower absorbing polarizer 606 and the transflective layer 608. This additional reflective polarizer 609 advantageously increases the amount of light that passes through the display 600 from the backlight 610. The reflecting polarizer, 609, lower absorbing polarizer 606 and transflector layer 608 may be referred to jointly as forming a "transflector assembly."

Ray 640 is incident on the upper absorbing polarizer 602 with polarization parallel to the pass polarization of the upper absorbing polarizer 602. Therefore, ray 640 is transmitted through the absorbing polarizer 602 to the LCD 604. The polarization of ray 640 is not rotated on passing through the LCD 604, and ray 640 is absorbed in the lower absorbing polarizer 606.

Ray 642 is transmitted through the upper absorbing polarizer 602, and has its polarization rotated by the LCD 604. Therefore, ray 642 passes through the lower absorbing polarizer 606. Ray 642 is also transmitted through the reflective polarizer 609, and is reflected by the transflector layer 608, to emerge at the output of the display 600 as ray 643. A portion of ray 642 may be transmitted through the transflector layer 608 towards the diffuse reflector 626, and may be recycled.

Ray 644 passes upwards from the light source 610 and the light control layer 612. Ray 644 is substantially transmitted through the transflector layer 608, but, because its polarization is orthogonal to the pass polarization state of the lower absorbing polarizer 606, ray 644 reflected at the reflective polarizer 609, back towards the diffuse reflector 626 where it may be recycled. This is different from the embodiment illustrated in FIG. 5, which has no reflective polarizer intermediate the transflector layer 508 and lower absorbing polarizer 506. Accordingly, in the embodiment illustrated in FIG. 5, a substantial fraction of the light from the backlight is absorbed in the lower absorbing polarizer 506. This is avoided in the present embodiment 600 due to the intermediate reflective polarizer 609.

Ray 646 is directed upwards from the light source 610 and the light control layer 612. A fraction of ray 646 is reflected by the transflector layer 608 as ray 647 and is directed towards the diffuse reflector 626, where it may be recycled. A portion of ray 646 transmitted through the transflector layer 608 is also transmitted through the intermediate reflective polarizer 609 and the lower absorbing polarizer 606. The polarization of ray 646 is not rotated by the LCD 604, and so ray 646 is absorbed by the upper absorbing polarizer 602.

Ray 648 is directed upwards from the light source 610 and the light control layer 612. A fraction of ray 646 is reflected by the transflector layer 608 as ray 649 towards the diffuse reflector 626, where it may be recycled. A fraction of ray 648 transmitted through the transflector layer 608 is also transmitted through the intermediate reflective polarizer 609 and the lower absorbing polarizer 606. The polarization of ray 648 is rotated by the LCD 604, and therefore ray 648 is transmitted through the upper absorbing polarizer 602 and is emitted as image light viewable by the user.

It will be appreciated that different types of light source may be used with the display 600. For example, a light source of the type illustrated in FIG. 4 may also be used with the display 600. The display 600 need not include the light control layer 612, or may include only one light directing layer 614.

The different layers in the display 600 may be separated from each other, may be adhered to each other, for example using an adhesive, lamination, or other suitable method of attaching one layer to the other.

Figure 7:
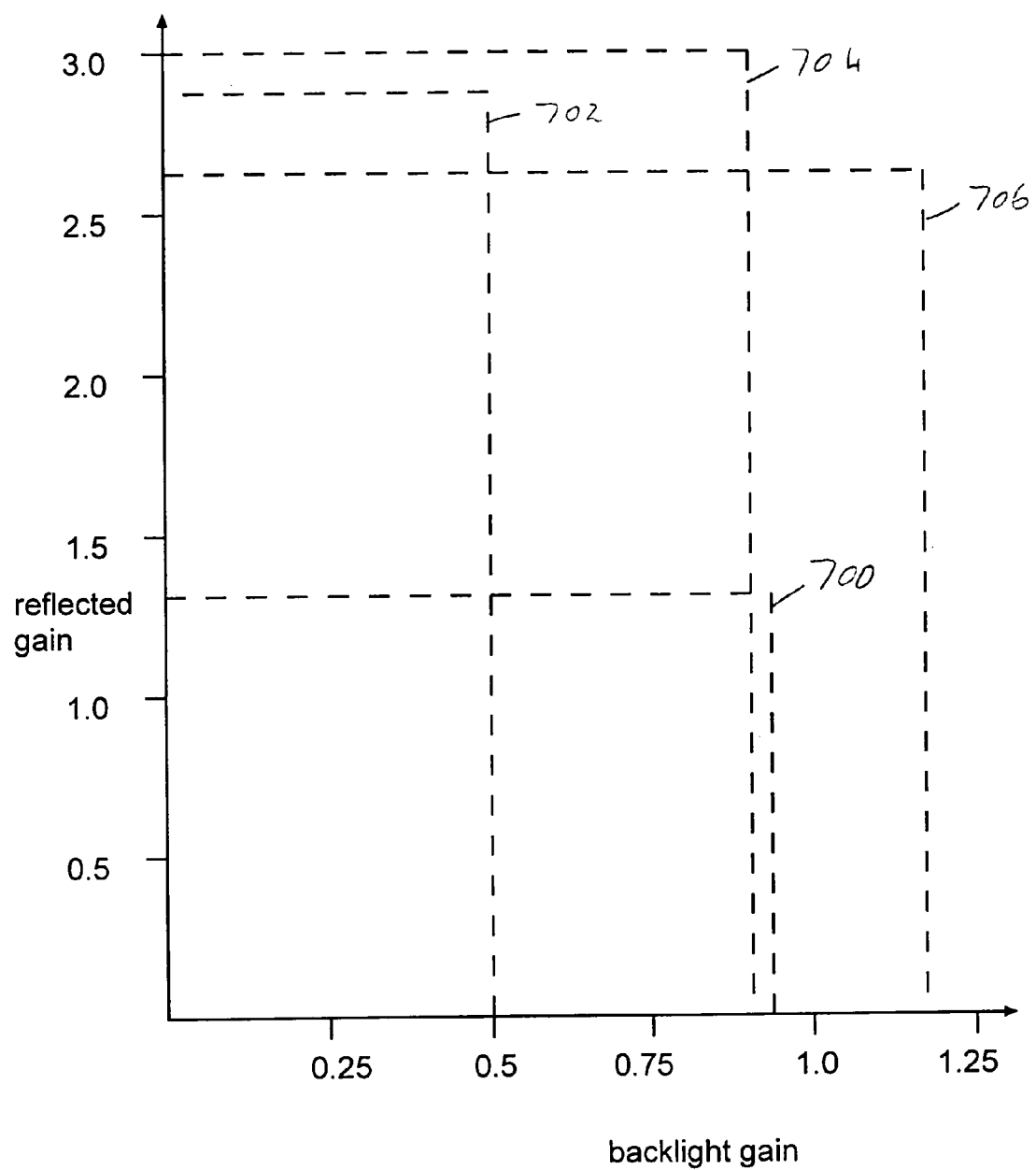
FIG. 7 is a graph showing reflected gain and backlight gain for the embodiments of backlight display illustrated in FIGS. 4–6.

The relative performance of the different types of non-inverting transflector display illustrated in FIGS. 4–6 is illustrated in FIG. 7. The reflected gain of a display is plotted against the backlight gain. Gain is defined as the on-axis illumination performance relative to a perfect Lambertian source.

The reflected and backlight gain of the embodiment illustrated in FIG. 4 are shown as curve 700. The reflected and backlight gain for the embodiment illustrated in FIG. 5 are illustrated as curve 702. The reflected and backlight gain for the embodiment illustrated in FIG. 6 is shown as curves 704 and 706. The difference in curves 704 and 706 depends on the alignment angle, θ, between the pass polarization axes of the intermediate reflective polarizer 609 and the lower reflective polarizer 632. Curve 704 corresponds to an angle θ=75° and curve 706 corresponds to an angle θ= 70°.

The addition of a reflective polarizer for use as transflector, as shown with curve 702, increases the reflected gain relative to a display using a metallic flake transflector film, curve 700. This is because the orientation of the reflective polarizer may be selected to increase the amount of ambient light reflected. However, the backlight gain of curve 702 is less than that of 700, because the selection of the angle for the reflective polarizer to increase reflected gain results in a reduction in the amount of light passing through the display from the backlight.

The intermediate reflective polarizer 609 reflects and recycles light from the backlight 610 that would otherwise be absorbed in the lower absorbing polarizer 606. This additional recycling of light results in an increase in the backlight gain, without any significant detriment to the reflected gain.

Figure 8A:
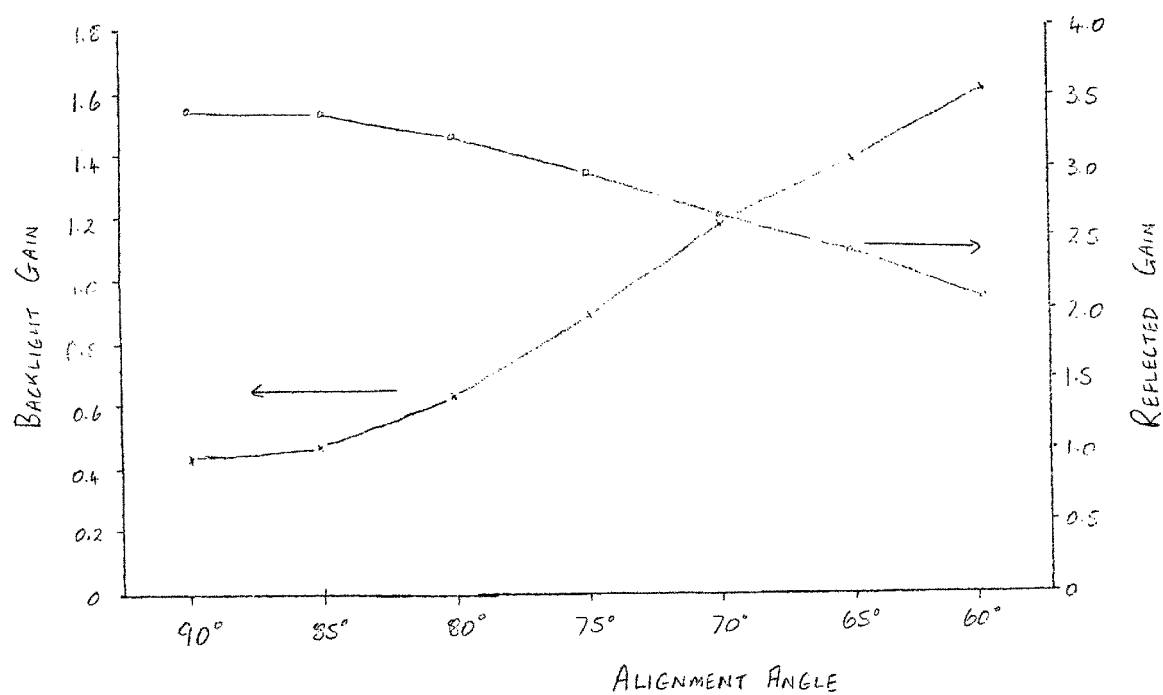
FIG. 8A is a graph showing reflected gain and backlight gain plotted against alignment angle for the modified transflective display illustrated in FIG. 6.

FIG. 8A shows the effect of changing the alignment angle, θ, between the transmission axis of the intermediate reflective polarizer 609 and the reflective polarizer 632. The backlight gain and reflected gain were each measured as a function of alignment angle, θ, between the two reflective polarizers 609 and 632. These measurements were made using seven different samples. Each sample was fabricated as a stack of three linear polarizers, one absorbing polarizer and two reflecting polarizers, ordered with the first reflecting polarizer sandwiched between the second reflective polarizer and the absorbing polarizer. The absorbing polarizer was a high contrast iodine type absorbing polarizer and the two reflective polarizers were multiple layer polarizers, sold commercially as Dual Brightness Enhancement Film (DBEF) by 3M Company, St. Paul, Minn. In all samples, the polarizers were bonded together using an optically clear pressure sensitive adhesive. For each of the seven samples, the pass polarization axis of the absorbing polarizer was aligned with the pass polarization axis of the intermediate reflective polarizer. The alignment angle between the pass polarization axes of the two reflective polarizers was different for each sample. The samples were formed with the alignment angle, θ, ranging from 90° to 60° in 5° increments. The sample was bonded on a clear glass slide, with the absorbing polarizer facing the slide, using a diffuse pressure sensitive adhesive.

Reflective gain compares the ratio of the on-axis polarized reflectivity of the sample under test versus a white Lambertian standard when illuminated with an unpolarized illumination annulus of 10° half angle.

Backlight gain compares the ratio of the on-axis transmitted luminance of a diffuse light cavity with and without the sample under test. The diffuse light cavity included an edge-lit polymer lightguide with a diffuse top surface and a free floating bottom white reflector. Green LEDs provided the illumination sources. A standard display absorbing polarizer was placed on the lightguide to mimic the transmissive operation of an LCD. The sample under test was placed with the absorbing polarizer side facing away from the light sources but aligned substantially parallel and underneath the fixed absorbing polarizer acting as the LCD layer. With this arrangement, brightness improvements resulting from polarization recycling were recorded.

As can be seen, the backlight gain increases as the alignment angle, θ, is reduced from 90°, whereas the reflected gain falls as the alignment angle is reduced from 90°. The alignment angle, θ, is a matter of choice, and may be selected by balancing out various factors such as illumination power, and desired screen brightness under different lighting conditions. The alignment angle, θ, may be in the range of any angle greater than 0° up to 90°, and is more preferably in the range between 40° and 90°.

Figure 8B:
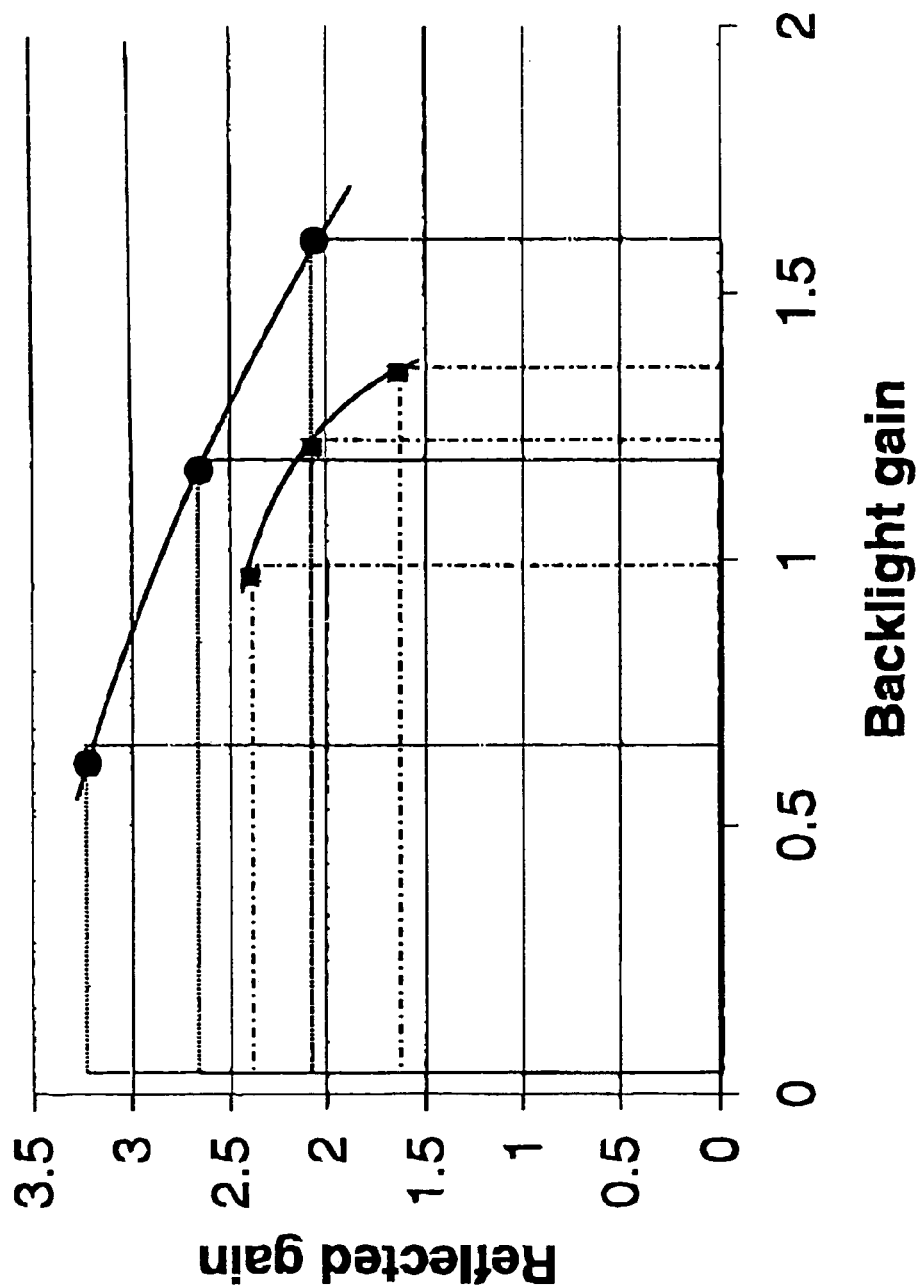
FIG. 8B is a graph showing reflected gain and backlight gain for the embodiment illustrated in FIG. 6, for various values of alignment angle between the intermediate polarizer and the absorbing polarizer.

The transmission polarization axis of the intermediate reflecting polarizer 609 need not be aligned exactly with the transmission polarization axis of the absorbing polarizer 606. FIG. 8B illustrates a graph showing reflected gain plotted against backlight gain for different values of a, the alignment angle between the transmission polarization axes of the absorbing polarizer 606 and the intermediate reflecting polarizer 609. The first curve 802 corresponds to a value of α=0°, where the transmission axis of the intermediate reflecting polarizer is aligned with the transmission axis of the absorbing polarizer. The different points on the curve correspond to different values of θ, the angle between the transmission axes of the two reflective polarizers. The second curve corresponds to a value of α=10°, in other words the transmission axes of the absorbing polarizer and the intermediate reflective polarizer are misaligned by 10°. The three point on the curve correspond to the same values of θ as were used in curve 802.

While the transflective may be operated with α≠0°, for example with α≦15°, it is apparent from the results shown in FIG. 8B that the combination of reflected and backlight gain is preferred when α=0°. For example, where the backlight gain is 1, the reflected gain is approximately 2.8 when α=0°, but is only about 2.4 when α=10°. Furthermore, when the reflected gain is about 2.1, the backlight gain is approximately 1.6 when α=0°, but is only about 1.2 when α=10°.

Figure 9:
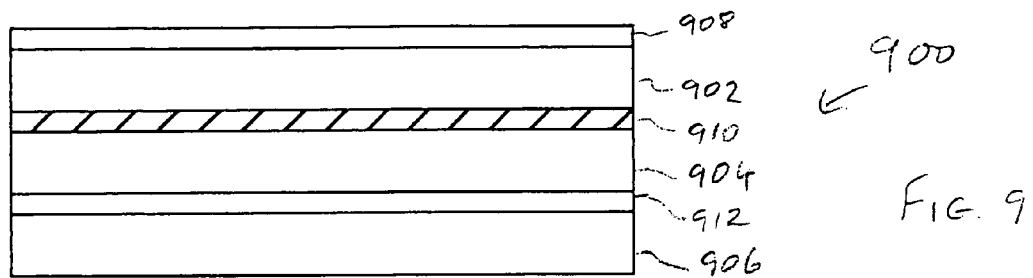
FIGS. 9–12 schematically illustrate different embodiments of transflector assembly according to the present invention.
Figure 10:
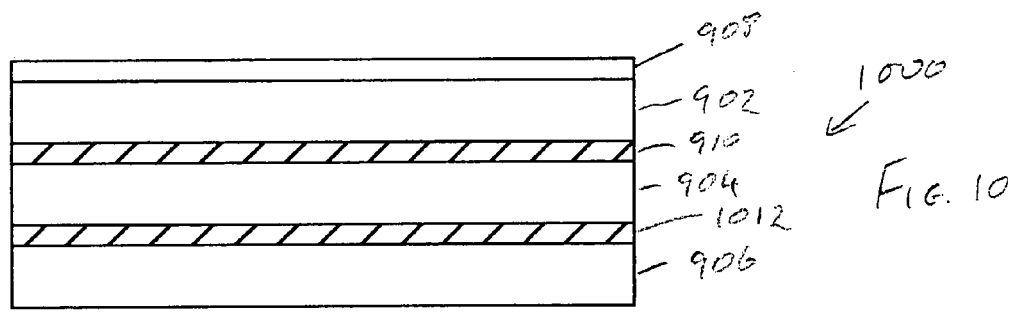

Different embodiments of transflector assembly are schematically illustrated in FIGS. 9–12. In FIG. 9, the transflector assembly 900 includes an absorbing polarizer 902, an intermediate reflective polarizer 904 and a lower reflective polarizer 906. The intermediate reflective polarizer 904 is typically arranged so that the pass polarization state of the intermediate reflective polarizer 904 is approximately parallel to the pass polarization state of the absorbing polarizer 902. The pass polarization state of the lower reflective polarizer 906 is oriented at the alignment angle, θ, relative to the pass polarization state of the absorbing polarizer 902.

The intermediate and lower reflecting polarizers 904 and 906 may be formed from any suitable type of reflecting polarizer, such as a multilayer reflecting polarizer, a wire grid reflecting polarizer, or a diffusely reflecting polarizer, for example DRPF film manufactured by 3M Company, St. Paul, Minn. Furthermore, one or both of the intermediate and lower reflecting polarizers 904 and 906 may be cholesteric polarizers, as is described further below.

The absorbing and reflecting polarizers 902, 904 and 906 may be laminated together, for example using adhesive layers, thermal lamination methods or solvent bonding. Any adhesive layer used in lamination may be a diffusing adhesive layer in order to introduce some diffusion, for example to hide cosmetic defects such as color non-uniformities or dust specks and to diffuse the light so that it may be viewed over a range of angles. Furthermore, the diffusing adhesive layer is advantageously polarization preserving in order to maintain display contrast. For example, the transflector assembly 900 may be provided with an upper adhesive layer 908 for attaching the absorbing polarizer 902 to the LCD, or other layer. The transflector assembly 900 may also be provided with an adhesive layer 910 between the absorbing polarizer 902 and the intermediate reflecting polarizer 904, and another adhesive layer 912 between the two reflective polarizers 904 and 906. In the particular embodiment shown, the adhesive layer 910 between the absorbing polarizer 902 and the intermediate reflecting polarizer 904 is a diffusing adhesive layer, indicated by hatching.

Any one or more of the adhesive layers 908, 910 and 912 may be diffusing layers. For example, the transflector assembly 1000 illustrated in FIG. 10 includes two diffusing adhesive layers, namely the adhesive layer 910 between the absorbing polarizer 902 and the intermediate reflective polarizer 904, and the adhesive layer 1012 between the two reflecting polarizers 904 and 906. One advantage of this particular embodiment is that a laminate of diffusing adhesive and reflecting polarizer may be used for both of the reflecting polarizers in the transflector assembly 1000.

Figure 11:
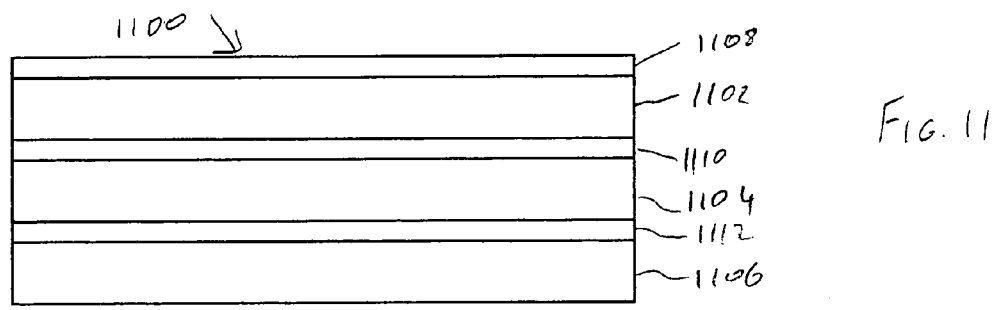

Another embodiment of a transflector assembly 1100 is schematically illustrated in FIG. 11. The transflector assembly 1100 includes an absorbing polarizer 1102, and a pair of reflective polarizer layers 1104 and 1106. The modified transflector 1100 may be provided with adhesive layers 1108, 1110 and 1112 for adhering the different polarizing layers 902, 904 and 906 together. In this embodiment, one or both of the reflective polarizers 1104 and 1106 may be a diffusely reflecting polarizer. An advantage of this embodiment is that diffusion is provided by at least one of the reflective polarizers 1104 and 1106, so there is no requirement for any of the adhesive layers 1108, 1110 and 1112 to be a diffusing layer. The transflector 1100 still provides some diffusion even if the adhesive layers 1108, 1110 and 1112 are omitted altogether, and the transflector assembly 1100 is manufactured using lamination.

Other features may be included to provide some diffusion without requiring a diffusing layer. For example, the surface of one or more of the layers may be roughened, and the refractive index difference at the roughened surface may be sufficient to provide some diffusion.

Figure 12:
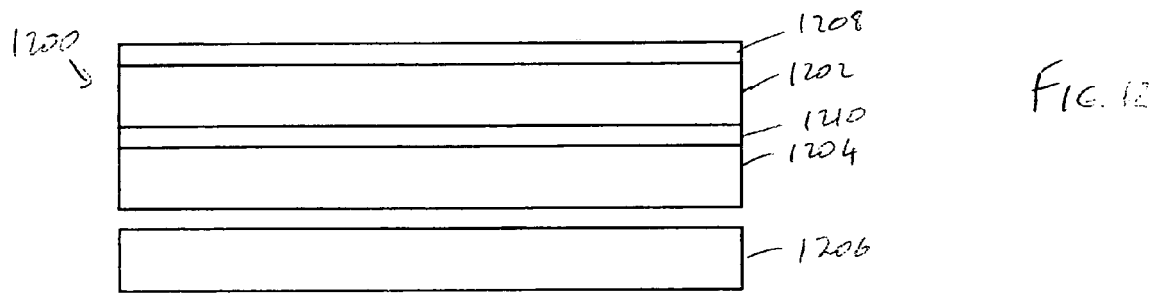

In the embodiment illustrated in FIG. 12, the modified transflector 1200 includes an absorbing polarizer 1202, an intermediate reflective polarizer 1204 and a lower reflective polarizer 1206. The intermediate reflective polarizer 1204 and the absorbing polarizer 1202 may be laminated, for example using one of the lamination techniques described above. In the particular embodiment illustrated, the intermediate reflective polarizer 1204 and the absorbing polarizer 1202 are laminated using an adhesive layer 1210, or may be laminated together, although it will be appreciated that the adhesive layer is not required for lamination. Furthermore, the intermediate reflective polarizer 1204 and the absorbing polarizer 1202 may be processed as a single unit, for example as described in WO 95/17691, incorporated herein by reference.

The top surface of the absorbing polarizer 1202 may be provided with another adhesive layer 1208 for adhering the absorbing polarizer to another display layer, such as an LCD. In this particular embodiment, the lower reflective polarizer 1206 is not laminated or adhered to the intermediate reflective polarizer 1204, but is free floating. An advantage of this particular embodiment is that, in manufacturing, the absorbing polarizer 1202 and the intermediate reflective polarizer 1204 may be laminated together as they come off respective rolls, while the lower reflective polarizer 1206 is included into the transflector assembly 1200 separately. It will be appreciated that the two reflecting polarizers 1204 and 1206 may be laminated as a separate unit which is free floating relative to the absorbing polarizer 1202, instead of only the lower reflecting polarizer 1206 being free floating.

Figure 13:
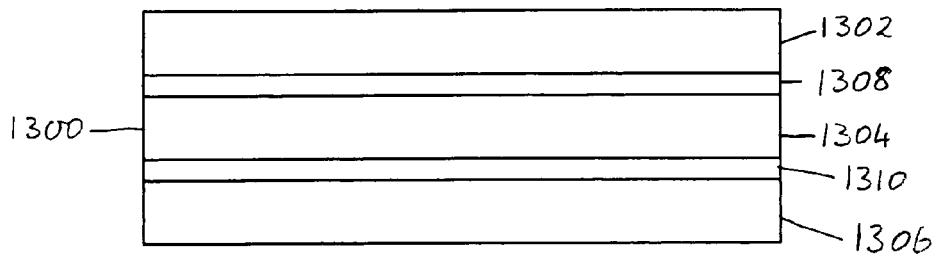
FIGS. 13 and 14 schematically illustrate different embodiments of transflector assembly using reflective circular polarizers, according to the present invention.

Another embodiment of transflector assembly 1300 is illustrated in FIG. 13. For this embodiment, and all other transflector embodiments illustrated below, clear or diffuse adhesive layers may be added between any or all of the layers illustrated. However, adhesive layers have been omitted from the drawings for clarity.

The transflector assembly 1300 uses reflective circular polarizers, such as cholesteric polarizers, instead of linear polarizers. The transflector assembly 1300 includes an absorbing polarizer 1302, an intermediate reflective circular polarizer 1304 and a lower reflective circular polarizer 1306. Retarder layers 1308 and 1310 may be disposed between the absorbing polarizer and the intermediate reflective circular polarizer 1304, and between the intermediate and lower reflective circular polarizers 1304 and 1306 respectively. The combination of a quarter wave retarder layer and a reflective circular polarizer has an optical effect similar to that of a reflective linear polarizer. The fast axis of the upper quarter wave retarder layer 1308 is oriented so that the combination of the upper quarter wave retarder 1308 and intermediate reflective circular polarizer 1304 has an effective polarization pass state that is substantially parallel to the pass polarization state of the absorbing polarizer 1302. Also, the fast axis of the lower quarter wave retarder 1310 is oriented so that the combination of the lower quarter wave retarder 1310 and the lower reflective circular polarizer 1306 has an effective polarization pass state that is oriented at an alignment angle, $\theta$, relative to the pass polarization state of the absorbing polarizer 1302. It will be appreciated that the retarder layers need not be quarter wave retarders, which will result in the transmission of elliptically polarized light when combined with a circular polarizer.

Thus the lower reflective polarizer 1306 and quarter wave retarder 1310 combine to reflect a large fraction of the ambient light incident through the absorbing polarizer 1302. The intermediate reflective circular polarizer 1304 and upper quarter wave retarder 1308 transmit the ambient light transmitted through the absorbing polarizer 1302. The intermediate reflecting polarizer 1304 also reflects a large fraction of the light transmitted through the lower reflective circular polarizer 1306 towards the absorbing polarizer 1302 that would otherwise be absorbed in the absorbing polarizer 1302.

Figure 14:
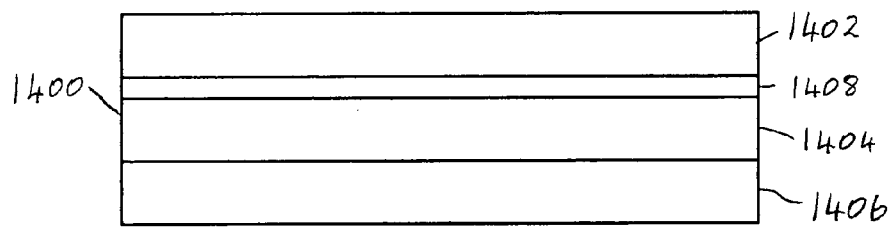

Another embodiment of transflector assembly 1400 is schematically illustrated in FIG. 14. The transflector assembly 1400 includes an absorbing polarizer 1402, an intermediate reflective circular polarizer 1404 and a quarter wave retarder layers 1408 disposed between the absorbing polarizer 1402 and the intermediate reflective circular polarizer 1404. A cholesteric reflective elliptical polarizer layer 1406 is disposed below the intermediate reflective circular polarizer 1404. Light passing up through the reflective elliptical polarizer 1404 from a light source reaches the intermediate reflective circular polarizer 1404 in a mixed state of circular polarizations, only one of which is transmitted by the intermediate reflective circular polarizer 1404. Furthermore, the reflective elliptical polarizer 1406 reflects a significant fraction of the ambient light transmitted by the intermediate reflective circular polarizer 1404.

Figure 15:
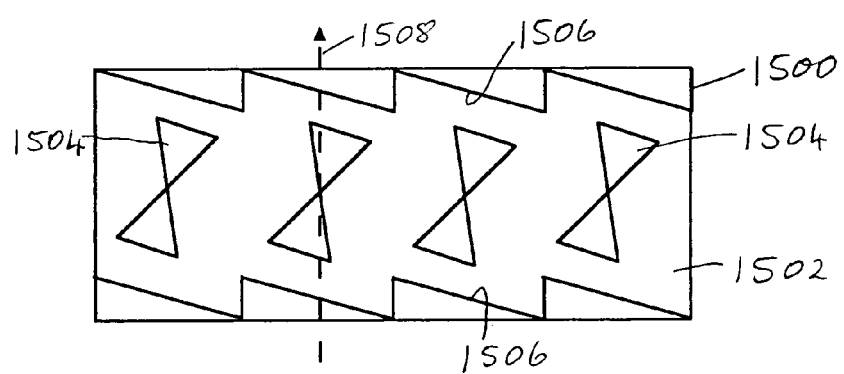
FIGS. 15 and 16 schematically illustrate different embodiments of reflective elliptical polarizer according to the present invention.

A reflective elliptical polarizer may be formed using cholesteric material in a film that is not aligned with the direction of light passing through the film. One embodiment of a reflective elliptical polarizer 1500 is illustrated in FIG. 15. The elliptical polarizer includes a film 1502 containing cholesteric liquid crystal material 1504. The cholesteric material 1504 is sandwiched between two structured surfaces 1506 oriented at an angle relative to the plane of the polarizer 1500. The structured surfaces 1506 may be formed, for example, through microreplication. The cholesteric material 1504 is encouraged to align at right angles to the structured surfaces 1506, with the result that the cholesteric material 1504 is aligned at an angle relative to the plane of the polarizer 1500. Therefore, light 1508 entering the polarizer 1500 at normal incidence encounters the cholesteric material 1504 aligned at an angle relative to the direction of propagation. Consequently, the cholesteric material 1504 elliptically polarizes the light 1508, rather than circularly polarizing the light as happens when the light propagates parallel to the axes of the cholesteric material.

Figure 16:
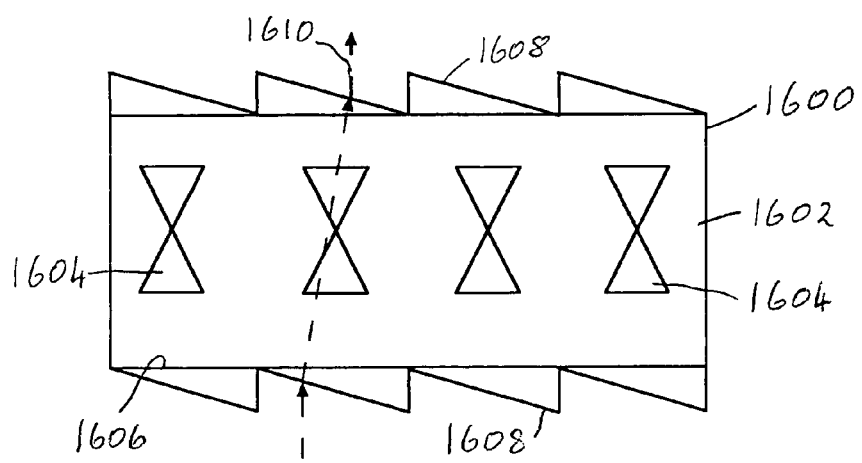

Another embodiment of reflective elliptical polarizer 1600 is illustrated in FIG. 16. The elliptical polarizer includes a film 1602 containing cholesteric material 1604. The cholesteric material 1604 is aligned normally to the surfaces 1606 of the film 1602, in a manner similar to a conventional circular polarizer. A refractive layer 1608 is positioned on either film surface 1606 to redirect light 1610 incident on the polarizer 1600 in a direction normal to the plane of the polarizer 1600. The refractive layer 1608 may include a plurality of prism structures, as illustrated, or may include other refractive structures to redirect the light through the polarizer 1600. The refractive layer 1608 may be formed by microreplication or other suitable technique. The refractive layer 1608 is preferably formed from a material having a refractive index substantially different from the refractive index of adjacent layers, in order to increase the redirecting effect of the refracting layer 1608. Light 1610 incident on the polarizer 1600 in a direction normal to the plane of the polarizer 1600 is redirected by the refracting layer 1608 so as to pass through the film 1602 at angle relative to the orientation of the cholesteric material 1604. The light 1610 is again redirected on passing out of the polarizer 1600 into a direction parallel to the direction of the light 1610 prior to passing into the polarizer 1600.

Figure 17:
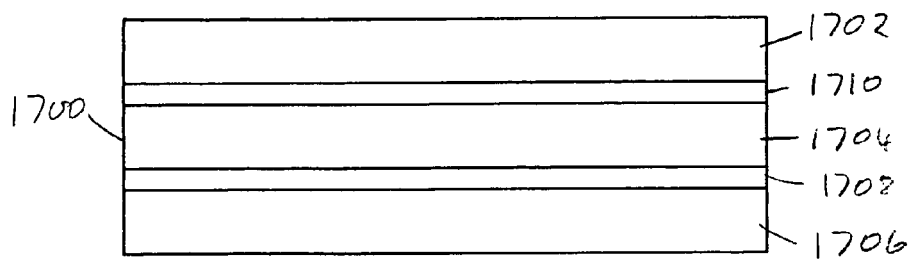
FIGS. 17–20 schematically illustrate additional embodiments of transflector assembly according to the present invention.

It will be appreciated that a transflector assembly may include a combination of linear and circular or elliptical polarizers. An embodiment of a transflector assembly 1700 containing such a combination is schematically illustrated in FIG. 17. The transflector 1700 includes an absorbing polarizer 1702, an intermediate reflective polarizer 1704 and lower reflective polarizer 1706. In this embodiment, the intermediate reflective polarizer 1704 is a linear reflecting polarizer aligned with its transmission polarization state substantially parallel to the transmission polarization state of the absorbing polarizer 1702.

The lower reflective polarizer 1706 may be a reflecting circular polarizer, with layer 1708 being a quarter wave retarder layer, so that light is transmitted to the intermediate reflective polarizer as linearly polarized light, and light is reflected by the lower reflective polarizer 1706 as circularly polarized light. The fast axis of the quarter wave retarder layer 1708 is oriented so that combination of quarter wave retarder layer 1708 and the lower reflective polarizer 1706 acts like a linear reflecting polarizer having a polarization transmission state oriented at an alignment angle, θ, relative to the polarization transmission state of the absorbing polarizer 1702.

In a related embodiment, (not shown), the quarter wave retarder layer 1708 may be omitted, and the lower reflecting polarizer 1706 is provided by a reflective elliptical polarizer oriented to reflect a substantial portion of ambient light transmitted through the intermediate reflective polarizer 1704.

Layer 1710 may be an adhesive layer, or may be an adhesive diffusing layer, or may be omitted altogether.

Figure 18:
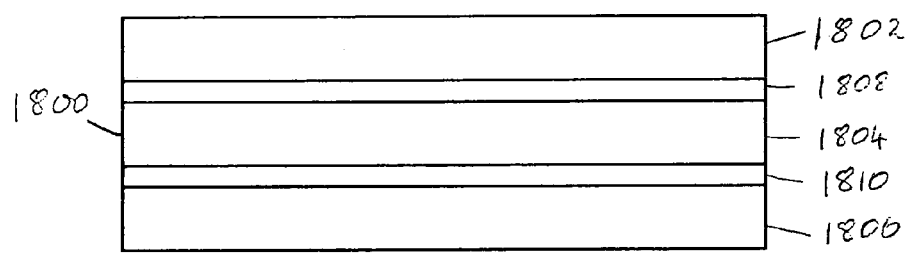

Another embodiment of transflector assembly 1800 that includes a combination of reflecting polarizer types is illustrated in FIG. 18. The transflector 1800 includes an absorbing polarizer 1802, an intermediate reflective polarizer 1804 and a lower reflective polarizer 1806. In this embodiment, the lower reflective polarizer 1804 is a linear reflecting polarizer. The intermediate reflecting polarizer 1804 may be a reflecting circular polarizer. Layer 1808 may be a quarter wave retarding layer having its fast axis aligned so that the combination of the intermediate reflecting polarizer 1804 and quarter wave retarding layer 1808 acts as a linear polarizer having its polarization transmission state aligned substantially parallel to the polarization transmission state of the absorbing polarizer 1802.

Layer 1810 may be an adhesive layer or an adhesive diffusing layer. In addition, layer 1810 may be a polarization rotating layer, for example a half wave retarding layer, for coupling light between the lower reflective polarizer 1806 and the intermediate reflective polarizer 1804. For example, the polarization transmission state of the lower reflecting polarizer 1806 may be substantially parallel to the polarization transmission state of the absorbing polarizer 1802. In such a case, the polarization rotating layer 1810 may rotate the polarization of light transmitted by the lower reflective polarizer so as to be at an angle, θ, relative to the polarization transmission state of the absorbing polarizer 1802. An advantage of this embodiment is that polarization transmission states of the absorbing polarizer 1802 and the lower reflective polarizer 1806 may be parallel, thus permitting the transflector 1800 to be assembled from parallel rolls of absorbing polarizer film and reflecting linear polarizer film.

Figure 19:
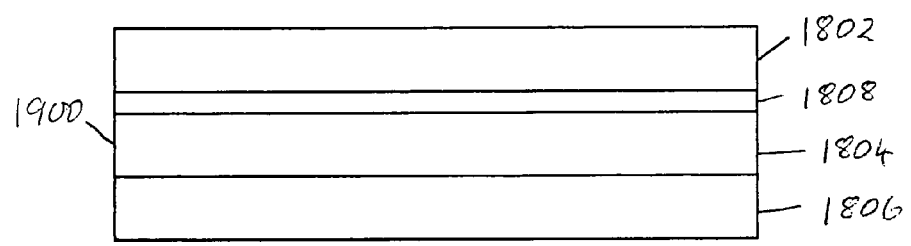

It will be appreciated that polarization rotating layer 1810 may be omitted altogether, for example as illustrated for the transflector 1900 shown in FIG. 19. In this case, the polarization transmission axis of the lower reflective polarizer 1806 is oriented at an angle, θ, relative to the polarization transmission axis of the absorbing polarizer 1802.

Figure 20:
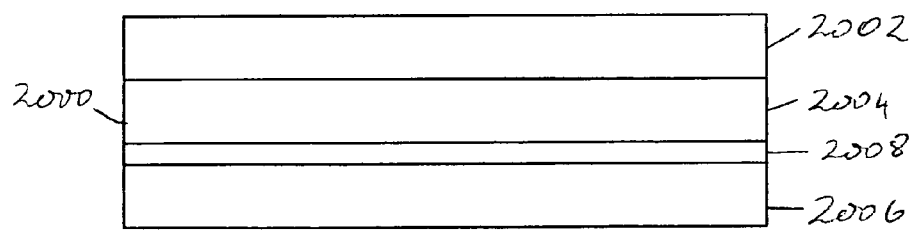

Another embodiment of modified transflector 2000 is illustrated in FIG. 20. The transflector 2000 includes an absorbing polarizer 2002, an intermediate reflecting polarizer 2004 and a lower reflecting polarizer 2006. In this particular embodiment, the two reflecting polarizers 2004 and 2006 are reflecting linear polarizers, each aligned with its polarization transmission state aligned substantially parallel with the polarization transmission state of the absorbing polarizer. A polarization rotating layer 2008, for example a half wave retardation layer, is disposed between the reflecting polarizers 2004 and 2008 so as to rotate the polarization of light passing from one reflecting polarizer to the other. An advantage of this embodiment is that it permits the transflector 2000 to be manufactured using parallel rolls of absorbing and reflecting polarizers, thus simplifying the manufacturing process.

Figure 21:
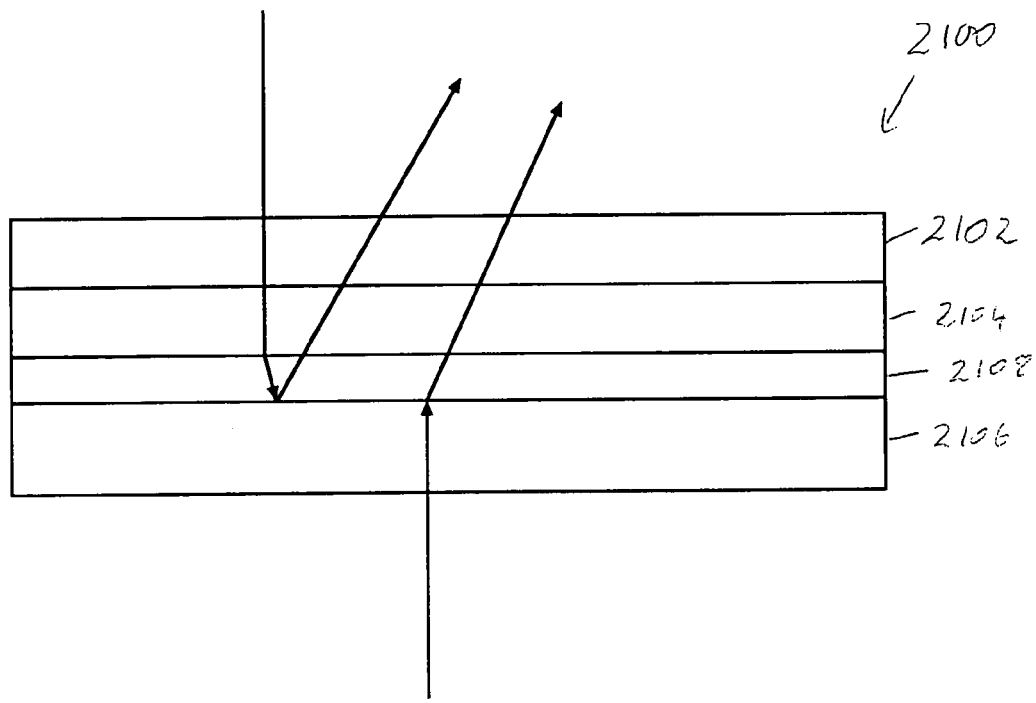
FIG. 21 schematically illustrates an embodiment of a transflector assembly incorporating a light steering layer according to the present invention.

It will be appreciated that different layers for performing additional functions may be included between the polarizer layers of a transflective assembly, as well being positioned outside the transflective assembly, for example between the transflective assembly and a light source. One particular embodiment of a transflective assembly having an additional layer is illustrated in FIG. 21. The transflective assembly 2100 includes an absorbing polarizer layer 2102, an intermediate reflective polarizer layer 2104 and a lower reflective polarizer layer 2106. A light steering layer 2108, for example a holographic layer, is positioned between the two reflective polarizer layers 2106 and 2108. The light steering layer 2108 may be used for directing light, particularly light generated in a backlight, in a preferred direction. This may be useful, for example, where the position of the viewer is likely to be off axis relative to the transflective display. The light steering layer 2108 may also be positioned between the absorbing polarizer 2102 and the intermediate reflective polarizer 2104.

Figure 22:
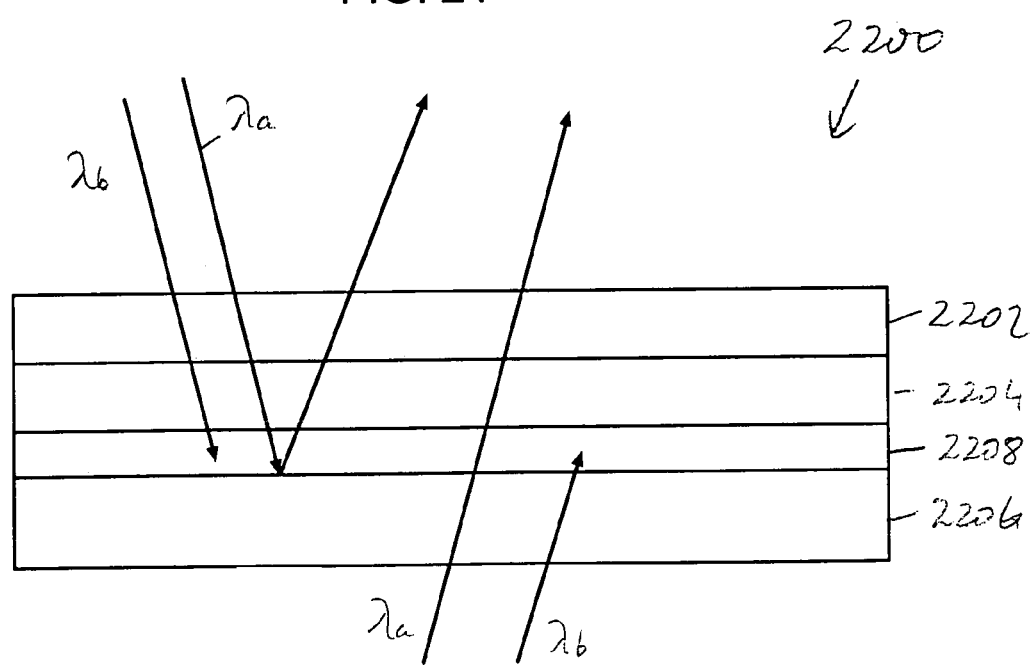
FIG. 22 schematically illustrates an embodiment of a transflector assembly incorporating a color filter layer according to the present invention.

Another embodiment of transflective assembly 2200 is illustrated in FIG. 22. The transflective assembly 2200 includes an absorbing polarizer layer 2202, an intermediate reflective polarizer layer 2204 and a lower reflective polarizer layer 2206. A color filter layer 2208 is disposed between the two reflective polarizer layers 2106 and 2108. The color filter layer may be used to filter out a particular wavelength range or ranges of the reflected and transmitted light. For example, the color filter layer 2208 may transmit light at a first wavelength, $\lambda a$, and absorb light at a second wavelength $\lambda b$. This is advantageous, for example, for producing a colored background, rather than a white background. It will be appreciated that one or more of the absorbing polarizers or reflective polarizers in the transflective display may be wavelength dependent so as to permit control of the light spectrum viewed by the user.

As noted above, the present invention is applicable to transflective displays, and is believed to be particularly useful for increasing the brightness, and reducing the power consumption of such displays.

While various examples were provided above, the present invention is not limited to the specifics of the illustrated embodiments. For example, the different layers of a display may be laminated together, for example using adhesive, heat lamination or some other suitable technique or using a combination of techniques. One or more of the layers of a display may be free floating. Furthermore, additional bonding layers may be used to attach adjacent layers, rather than using lamination. The transflective display may use any suitable, including the types of light source illustrated herein. In addition, the absorbing polarizers on either side of the LCD need not be oriented with their pass polarization directions at 90° relative to each other, but may be at some other angle, depending on the rotation of the polarization of light transmitted through the LCD.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A passive transflective assembly for use in a display between a display module and a light source, the assembly comprising:
   an absorbing polarizer on a display side of the assembly, defining an absorbing polarizer transmission polarization state;
   a first reflective polarizer disposed to receive light transmitted through the absorbing polarizer from the display side of the assembly, the first reflective polarizer defining a first reflective polarizer transmission polarization state in a preselected relationship with the absorbing polarizer transmission polarization state; and
   a second reflective polarizer layer disposed on a light source side of the assembly to receive light transmitted through the first reflective polarizing layer from the absorbing polarizer, the second reflective polarizer defining a second reflective polarizer transmission polarization state different from the absorbing polarizer transmission polarization state.

2. An assembly as recited in claim 1, wherein the first reflective polarizer transmission polarization state is substantially similar to the absorbing polarizer transmission polarization state.

3. An assembly as recited in claim 1, wherein the absorbing polarizer transmission polarization state is a linear polarization state and the first reflective polarizer transmission polarization state is a linear polarization state oriented within about 15° of the absorbing polarizer transmission polarization state.

4. An assembly as recited in claim 1, wherein the first reflective polarizer includes a reflective linear polarizer.

5. An assembly as recited in claim 1, wherein the first reflective polarizer includes a reflective circular polarizer and a retarder layer disposed between the reflective circular polarizer and the absorbing polarizer.

6. An assembly as recited in claim 5, wherein the retarding layer is a quarter wave retarder.

7. An assembly as recited in claim 1, wherein the second reflective polarizer includes a reflective linear polarizer.

8. An assembly as recited in claim 7, wherein the absorbing polarizer transmission polarization state is a linear polarization state and the second reflective polarizer transmission polarization state is a linear polarization state non-parallel with the absorbing polarizer transmission polarization state.

9. An assembly as recited in claim 7, the second reflective polarizer including a passive polarization rotating layer between the reflective linear polarizer and the first reflective polarizer, the reflective linear polarizer defining a reflective linear polarizer transmission polarization state substantially parallel with the absorbing polarizer transmission polarization state.

10. An assembly as recited in claim 1, wherein the second reflective polarizer includes a reflective circular polarizer and a retarder layer disposed between the reflective circular polarizer and the first reflective polarizer.

11. An assembly as recited in claim 10, wherein the retarder layer is a quarter wave retarder.

12. An assembly as recited in claim 1, wherein the second reflective polarizer is a reflective elliptical polarizer.

13. An assembly as recited in claim 12, wherein the reflective elliptical polarizer includes an elliptical polarizer film having a film plane and helical cholesteric material aligned substantially non-perpendicular to the film plane.

14. An assembly as recited in claim 12, wherein the reflective elliptical polarizer includes an elliptical polarizer film having a film plane and helical cholesteric material aligned substantially perpendicular to the film plane, the elliptical polarizer film having first and second surfaces provided with light refracting layers to deviate light incident on the light refracting layers in a direction substantially perpendicular to the film plane into a direction passing through the elliptical polarizer film substantially non-perpendicular to the film plane.

15. An assembly as recited in claim 1, wherein at least one of the first and second reflective polarizers includes a diffusely reflecting polarizer.

16. An assembly as recited in claim 1, wherein the first and second reflective polarizers are linear reflective polarizers, a transmission polarization axis of the second reflective polarizer being oriented at an angle in the range 60° to 90° relative to a transmission polarization axis of the first reflective polarizer.

17. An assembly as recited in claim 1, further including an adhesive layer between at least one of i) the absorbing polarizer and the first reflective polarizer and ii) the first and second reflective polarizers.

18. An assembly as recited in claim 1, further including a diffusive layer between at least one of i) the absorbing polarizer and the first reflective polarizer and ii) the first and second reflective polarizers.

19. An assembly as recited in claim 1, further including a light steering layer disposed to steer light passing through the first reflective polarizer to the absorbing polarizer.

20. An assembly as recited in claim 1, further including a color filter layer disposed to absorb light of one wavelength passing through the absorbing polarizer and transmitting light at a different wavelength passing through the absorbing polarizer.

21. A passive transflective assembly for use in a display between a light modulator and a light source, the assembly comprising:
   an absorbing polarizer disposed on a display side of the assembly;
   a first reflective polarizer disposed on a light source side of the assembly to reflect at least a portion of light transmitted through the absorbing polarizer; and
   a second reflective polarizer disposed between the absorbing polarizer and the first reflective polarizer, the second reflective polarizer reflecting light transmitted through the first reflective polarizer from the light source side of the assembly having a polarization absorbable in the absorbing polarizer, and the second reflective polarizer transmitting light transmitted through the absorbing polarizer towards the first reflective polarizer.

22. An assembly as recited in claim 21, wherein the second reflective polarizer is a linear reflecting polarizer having a polarization transmission axis oriented within 15° of a polarization transmission axis of the absorbing polarizer.

23. An assembly as recited in claim 21, wherein the second reflective polarizer is a linear reflective polarizer having a polarization transmission axis oriented substantially parallel to a polarization transmission axis of the absorbing polarizer.

24. An assembly as recited in claim 21, wherein the second reflective polarizer reflects substantially all the light transmitted through the first reflective polarizer having a polarization absorbable in the absorbing polarizer.

25. An assembly as recited in claim 21, further comprising at least one diffusing layer disposed between the absorbing polarizer and the second reflective polarizer or between the first and second reflective polarizers.

26. An assembly as recited in claim 21, wherein the second reflective polarizer includes a cholesteric polarizer and a retarding layer between the cholesteric polarizer and the absorbing polarizer disposed to substantially minimize reflection by the cholesteric polarizer of light transmitted through the absorbing polarizer towards the second reflective polarizer.

27. An assembly as recited in claim 21, wherein the second reflective polarizer is a reflecting linear polarizer oriented to transmit substantially all light received from the absorbing polarizer.

28. An assembly as recited in claim 21, wherein the first reflective polarizer is a linear polarizer.

29. An assembly as recited in claim 28, wherein the first reflective polarizer is oriented to permit transmission, through the first reflective polarizer, of a portion of light received by the first reflective polarizer from the absorbing polarizer.

30. An assembly as recited in claim 28, wherein the first reflective polarizer is a linear reflective polarizer having a transmission polarization axis substantially parallel with a transmission polarization axis of the absorbing polarizer, and further comprising a passive birefringent retarding layer disposed between the first and second reflective polarizers, the birefringent retarding layer being oriented to rotate polarization of light propagating between the first and second reflective polarizers.

31. An assembly as recited in claim 21, wherein the first reflective polarizer includes a cholesteric polarizer.

32. An assembly as recited in claim 31, wherein the cholesteric polarizer is a reflective circular polarizer, and the first reflective polarizer further includes a retarding layer disposed between the cholesteric polarizer and the second reflective polarizer oriented to allow transmission, through the first reflective polarizer, of a portion of light received by the first reflective polarizer from the absorbing polarizer.

33. An assembly as recited in claim 31, wherein the cholesteric polarizer is a reflective elliptical polarizer oriented to allow transmission, through the first reflective polarizer, of a portion of light received by the first reflective polarizer from the absorbing polarizer.

34. An assembly as recited in claim 21, further comprising a light steering layer for steering light passing through the absorbing polarizer from the second reflective polarizer.

35. An assembly as recited in claim 21, further comprising a color filter layer disposed to absorb light at a first wavelength transmitted by the absorbing polarizer and to transmit light at a second wavelength transmitted by the absorbing polarizer.

* * * * *

UNITED STATES PATENT AND TRADEMARK OFFICE
CERTIFICATE OF CORRECTION

PATENT NO. : 6,975,455 B1
DATED : December 13, 2005
INVENTOR(S) : Kotchick, Keith M.

It is certified that error appears in the above-identified patent and that said Letters Patent is hereby corrected as shown below:

<u>Title page,</u>
Item [75], Inventors, delete "Bennet" and insert -- Bennett --.

<u>Column 7,</u>
Line 20, delete "900" and insert -- 90° --.

Signed and Sealed this

Twenty-eighth Day of March, 2006

JON W. DUDAS
*Director of the United States Patent and Trademark Office*